(12) United States Patent
Morita

(10) Patent No.: US 11,487,171 B2
(45) Date of Patent: Nov. 1, 2022

(54) ELECTRO-OPTICAL DEVICE AND ELECTRONIC APPARATUS

(71) Applicant: SEIKO EPSON CORPORATION, Tokyo (JP)

(72) Inventor: Kikuya Morita, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/386,122

(22) Filed: Jul. 27, 2021

(65) Prior Publication Data
US 2022/0035208 A1 Feb. 3, 2022

(30) Foreign Application Priority Data
Jul. 28, 2020 (JP) .............................. JP2020-127097

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/136213* (2013.01); *G02F 1/136286* (2013.01)

(58) Field of Classification Search
CPC ......... G02F 1/136209; G02F 1/136213; G02F 1/136286; G02F 1/1368
See application file for complete search history.

(56) References Cited

U.S. PATENT DOCUMENTS
2002/0089617 A1 7/2002 Fukata et al.

FOREIGN PATENT DOCUMENTS

| JP | 2000-91581 A | 3/2000 |
|---|---|---|
| JP | 2000-356787 A | 12/2000 |
| JP | 2001-66633 A | 3/2001 |
| JP | 2009-265357 A | 11/2009 |
| JP | 2013-246358 A | 12/2013 |
| JP | 2013246359 A | * 12/2013 |

OTHER PUBLICATIONS

JP 2013246359 A translation (Year: 2013).*

* cited by examiner

*Primary Examiner* — James A Dudek
(74) *Attorney, Agent, or Firm* — Oliff PLC

(57) ABSTRACT

In an electro-optical device, a light shielding layer is provided at a first substrate between a second capacitance electrode and a second interlayer insulating layer, in a layer between the second capacitance electrode of a capacitance element and the pixel electrode. The light shielding layer includes a first portion stacked on the second capacitance electrode, and a second portion that protrudes from an end portion of the first portion, through a side of the first capacitance electrode of the capacitance element, toward both sides in a width direction of a semiconductor layer.

14 Claims, 16 Drawing Sheets

ELECTRO-OPTICAL DEVICE AND ELECTRONIC APPARATUS

The present application is based on, and claims priority from JP Application Serial Number 2020-127097, filed Jul. 28, 2020, the disclosure of which is hereby incorporated by reference herein in its entirety.

BACKGROUND

1. Technical Field

The present disclosure relates to an electro-optical device that includes, between a transistor and a pixel electrode, a light shielding layer that inhibits incidence of light on a semiconductor layer, and to an electronic apparatus.

2. Related Art

An electro-optical device used as a light valve or the like of a projection-type display device is provided with a semiconductor layer between a substrate body and the pixel electrode, and a transistor is configured using the semiconductor layer. In such an electro-optical device, structure has been proposed in which, in a capacitance element provided between a transistor and a pixel electrode, by protruding an end portion of the capacitance electrode on an upper layer side toward the semiconductor layer side, incidence of light on the semiconductor layer is suppressed (see JP 2001-66633 A).

The capacitance element has structure in which a capacitance electrode on a lower layer side, a thin dielectric film, and a capacitance electrode on an upper layer side are stacked, and thus as the structure described in JP 2001-66633 A, when an end portion of the capacitance electrode on the upper layer side is extended toward a side of the capacitance electrode on the lower layer side when a dielectric film is not present on a side of the capacitance electrode on the lower layer side, there is a possibility that the capacitance electrode on the upper layer side and the capacitance electrode on the lower layer side may be short-circuited. In addition, even when the end portion of the capacitance electrode on the lower layer side, the dielectric film, and the end portion of the capacitance electrode on the upper layer side are all extended toward the semiconductor layer side, the dielectric film is not appropriately formed at a portion facing the semiconductor layer, thus there is a possibility that the capacitance electrode on the upper layer side and the capacitance electrode on the lower layer side may be short-circuited. Therefore, there is a problem that it is difficult to suppress incidence of light on the semiconductor layer by a light shielding layer provided between the transistor and the pixel electrode while avoiding problems such as a short circuit.

SUMMARY

In order to solve the above-described problem, an aspect of an electro-optical device according to the present disclosure includes a substrate body, a pixel electrode, a transistor including a semiconductor layer in a layer between the substrate body and the pixel electrode, a capacitance element including a first capacitance electrode overlapping with the semiconductor layer, the capacitance element being in a layer between the first interlayer insulating layer and the pixel electrode, and a second capacitance electrode overlapping with the first capacitance electrode via a dielectric film, the second capacitance electrode being in a layer between the first capacitance electrode and the pixel electrode, and a light shielding layer that includes a first portion overlapping with the second capacitance electrode between the second capacitance electrode and the pixel electrode, and a second portion protruding from an end portion in a second direction intersecting the first direction of the first portion, through a side of the first capacitance electrode toward the substrate body side, the first portion being electrically coupled to the second capacitance electrode.

An electro-optical device to which the present disclosure is applied is used for a variety of electronic apparatuses. In the present disclosure, when an electronic apparatus is a projection-type display device, the projection-type display device is provided with a light source unit configured to emit light to be supplied to an electro-optical device, and a projection optical system configured to project light modulated by the electro-optical device.

DESCRIPTION OF EXEMPLARY EMBODIMENTS

Figure 1:
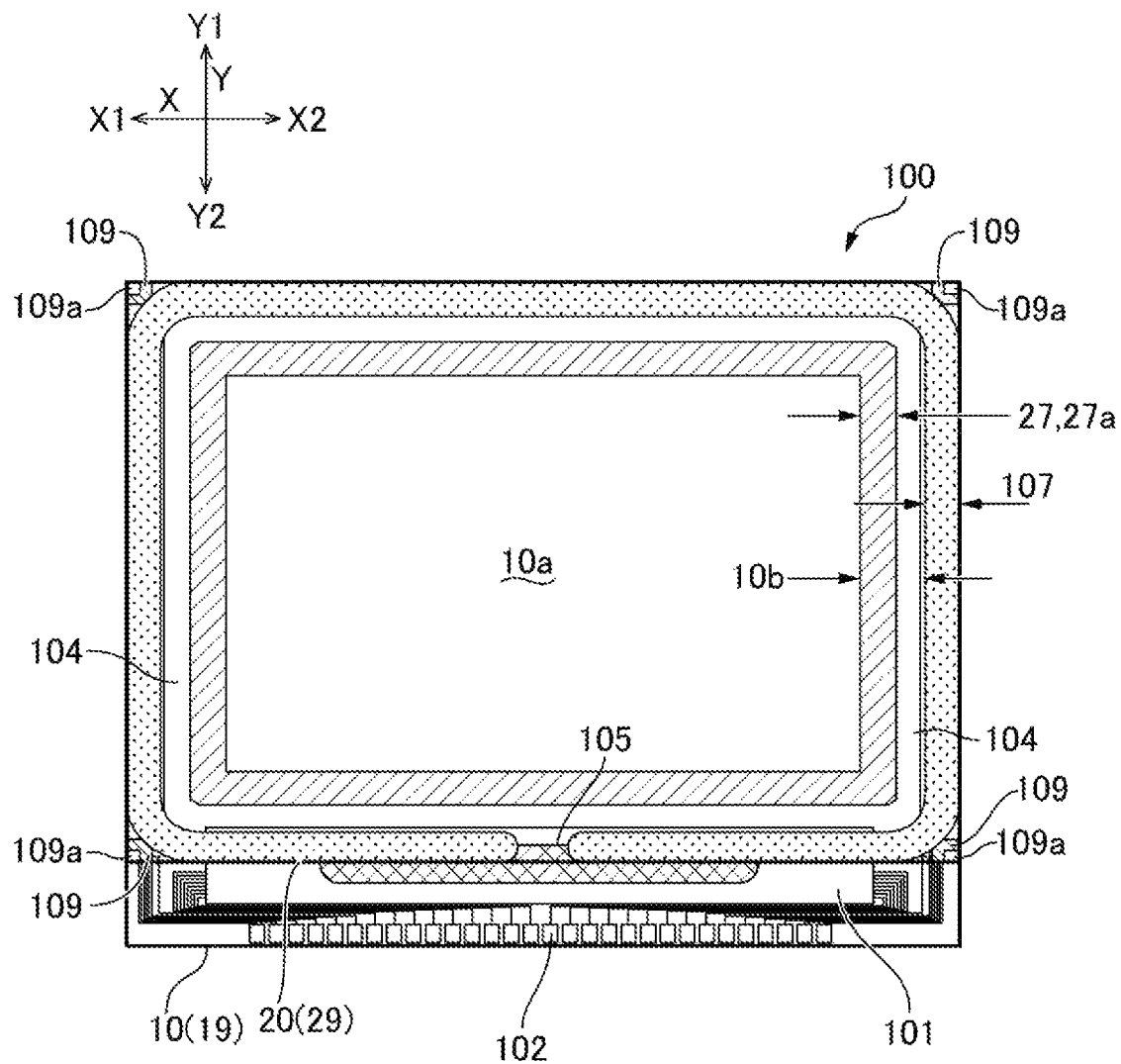
FIG. 1 is a plan view of an electro-optical device according to Exemplary Embodiment 1 of the present disclosure.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Moreover, in the description described below, when each layer formed at a first substrate 10 is described, an upper layer side or a front surface side means a side (a side on which a second substrate 20 is located) opposite to a side on which a substrate body 19 is located, and a lower layer side means a side on which the substrate body 19 is located. In addition, of two intersecting directions among in-plane directions of the first substrate 10, a direction in which a scan line 3a extends is a first direction X, and a direction in which a data line 6a extend is a second direction Y. In addition, one side in a direction along the second direction Y is one side Y1 in the second direction Y, another side in the direction along the second direction Y is another side Y2 in the second direction Y, one side in a direction along the first direction X is one side X1 in the first direction X, and another side in the direction along the first direction X is another side X2 in the first direction X.

Exemplary Embodiment 1

1. Configuration of Electro-optical Device 100

Figure 2:
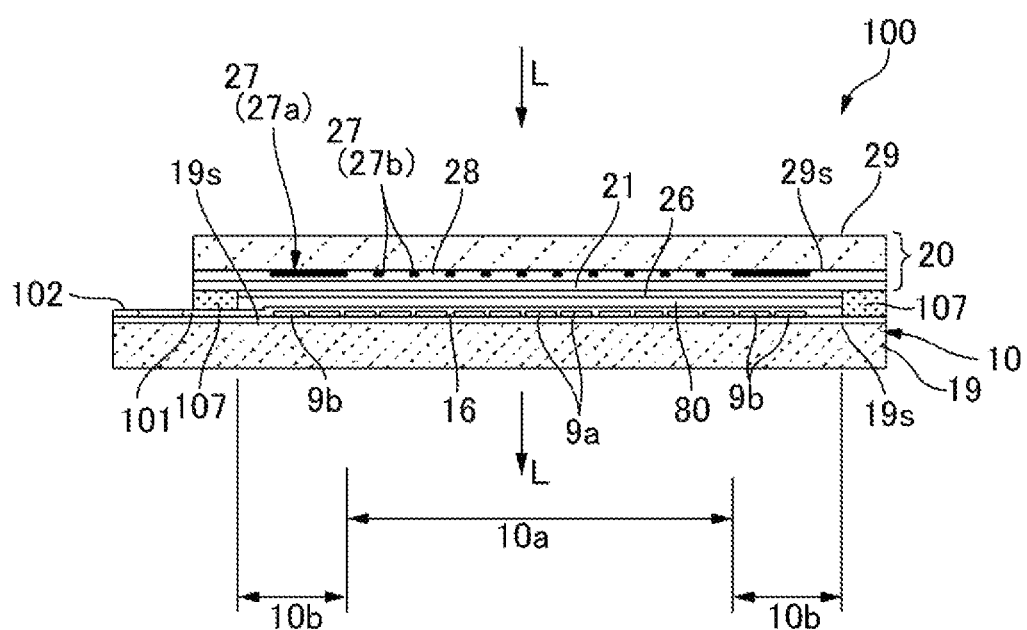
FIG. 2 is a cross-sectional view of the electro-optical device illustrated in FIG. 1.

FIG. 1 is a plan view of an electro-optical device 100 according to Exemplary Embodiment 1 of the present disclosure. FIG. 2 is a cross-sectional view illustrating the electro-optical device 100 illustrated in FIG. 1. As illustrated in FIG. 1 and FIG. 2, in the electro-optical device 100, the first substrate 10 and the second substrate 20 are bonded together with a sealing material 107 creating a predetermined gap, where the first substrate 10 is opposed to the second substrate 20. The sealing material 107 is provided in a frame-like shape in conformance with the outer edge of the second substrate 20. An electro-optical layer 80 such as a liquid crystal layer is provided in an area surrounded by the sealing material 107 between the first substrate 10 and the second substrate 20. The seal material 107 is a photocurable adhesive, or a photocurable and thermosetting adhesive, and a gap material such as glass fiber or glass beads for setting a distance between the substrates to a predetermined value is compounded in the sealing material 107. In the present exemplary embodiment, the first substrate 10 and the second substrate 20 both have a quadrangle shape, and in a substantially central portion of the electro-optical device 100, a display region 10a is provided as a quadrangle region. In accordance with such a shape, the sealing material 107 is also provided in a substantially quadrangular shape, and a peripheral region 10b having a rectangular frame shape is provided between an inner peripheral edge of the sealing material 107 and an outer peripheral edge of the display region 10a.

The first substrate 10 includes a substrate body 19 formed of a transmissive substrate such as a quartz substrate or a glass substrate. On one surface 19s side of the substrate body 19 on the second substrate 20 side, on an outer side of the display region 10a, a data line driving circuit 101 and a plurality of terminals 102 are formed along one side of the first substrate 10. A scan line driving circuit 104 is formed along other sides adjacent to the one side. Although not illustrated, a flexible wiring substrate is coupled to the terminals 102, and various kinds of potential and various signals are input to the first substrate 10 via the flexible wiring substrate.

The display region 10a on the one surface 19s of the substrate body 19 is formed, in a matrix pattern, with a plurality of transmissive pixel electrodes 9a made from an Indium Tin Oxide (ITO) film. A first orientation film 16 is formed on the second substrate 20 side with respect to the pixel electrodes 9a, and the pixel electrodes 9a are covered with the first orientation film 16.

The second substrate 20 includes a substrate body 29 formed of a transmissive substrate such as a quartz substrate or a glass substrate. On one surface 29s side, which faces the first substrate 10, of the substrate body 29, a transmissive common electrode 21 including, for example an ITO film or the like, is formed. A second orientation film 26 is formed on the first substrate 10 side with respect to the common electrode 21. The common electrode 21 is formed over substantially the entire surface of the second substrate 20, and is covered with the second orientation film 26. At the second substrate 20, a light shielding layer 27 having a light-shielding property and including resin, metal, or a metal compound is formed between the substrate body 29 and the common electrode 21. A transmissive protective layer 28 is formed between the light-shielding layer 27 and the common electrode 21. The light shielding layer 27 is formed, for example, as a partition 27a in a frame-like shape extending along the outer peripheral edge of the display region 10a. The light-shielding layer 27 is also formed as a light shielding layer 27b constituting a black matrix in regions overlapping in plan view with regions each located between the pixel electrodes 9a adjacent to each other. Regions overlapping, when viewed in plan view, with the partition 27a in the peripheral region 10b of the first substrate 10 are formed with dummy pixel electrodes 9b formed simultaneously with the pixel electrodes 9a. Note that, a lens may be provided at the second substrate 20 at a position facing the pixel electrode 9a, and in this case, the light shielding layer 27b is often not formed.

Any of the first orientation film 16 and the second orientation film 26 is an inorganic orientation film including a diagonally vapor-deposited film of SiOx (x<2), $SiO_2$, $TiO_2$, MgO, $Al_2O_3$, and the like, for example, and liquid crystal molecules having negative dielectric anisotropy used for the electro-optical layer 80 are tilt-oriented. Therefore, the liquid crystal molecules form a predetermined angle with respect to the first substrate 10 and the second substrate 20. In this way, the electro-optical device 100 is constituted as a liquid crystal device of a Vertical Alignment (VA) mode.

The first substrate 10 includes an inter-substrate conduction electrode 109 being formed in a region positioning outside the sealing material 107 and overlapping with a corner portion of the second substrate 20 such that electrical conduction is established between the first substrate 10 and the second substrate 20. An inter-substrate conduction material 109a including conductive particles is disposed in the inter-substrate conduction electrode 109. The common electrode 21 of the second substrate 20 is electrically coupled to the first substrate 10 side via the inter-substrate conduction material 109a and the inter-substrate conduction electrode 109. Therefore, common potential is applied to the common electrode 21 from the first substrate 10 side.

In the electro-optical device 100, the pixel electrodes 9a and the common electrode 21 are formed of a transmissive conductive film such as an ITO film, and the electro-optical device 100 is constituted as a transmissive liquid crystal device. In the electro-optical device 100, of the first substrate 10 and the second substrate 20, light that is incident to the electro-optical layer 80 from either one of the substrates is modulated while passing through the other substrate and being emitted, and displays an image. In the present exemplary embodiment, the electro-optical device 100 displays an image by the light incident from the second substrate 20 being modulated by the electro-optical layer 80 for each of the pixels while passing through the first substrate 10 and being emitted, as indicated by an arrow L.

2. Schematic Configuration of Pixels

Figure 3:
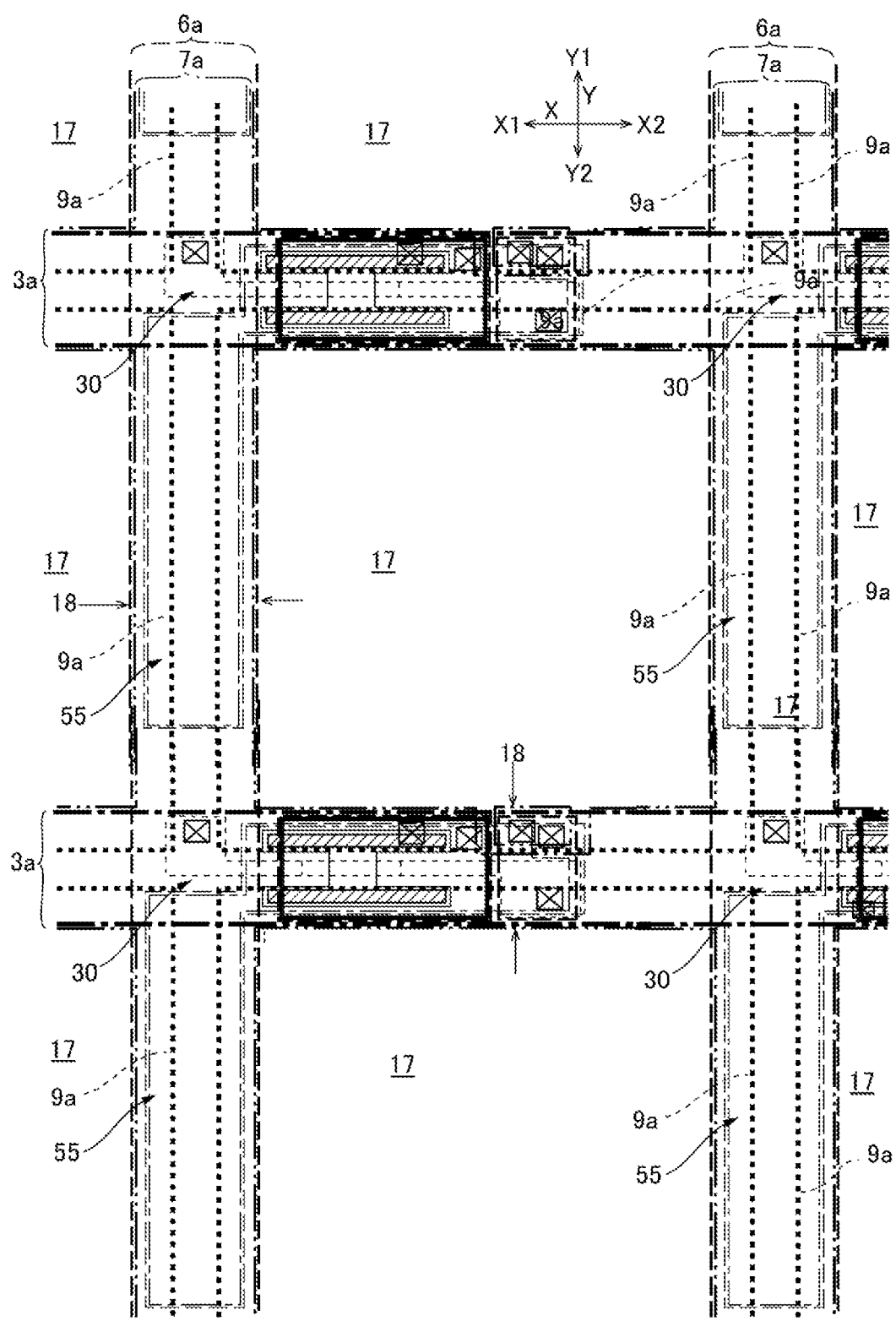
FIG. 3 is a plan view of a plurality of pixels adjacent to each other in the electro-optical device illustrated in FIG. 1.
Figure 4:
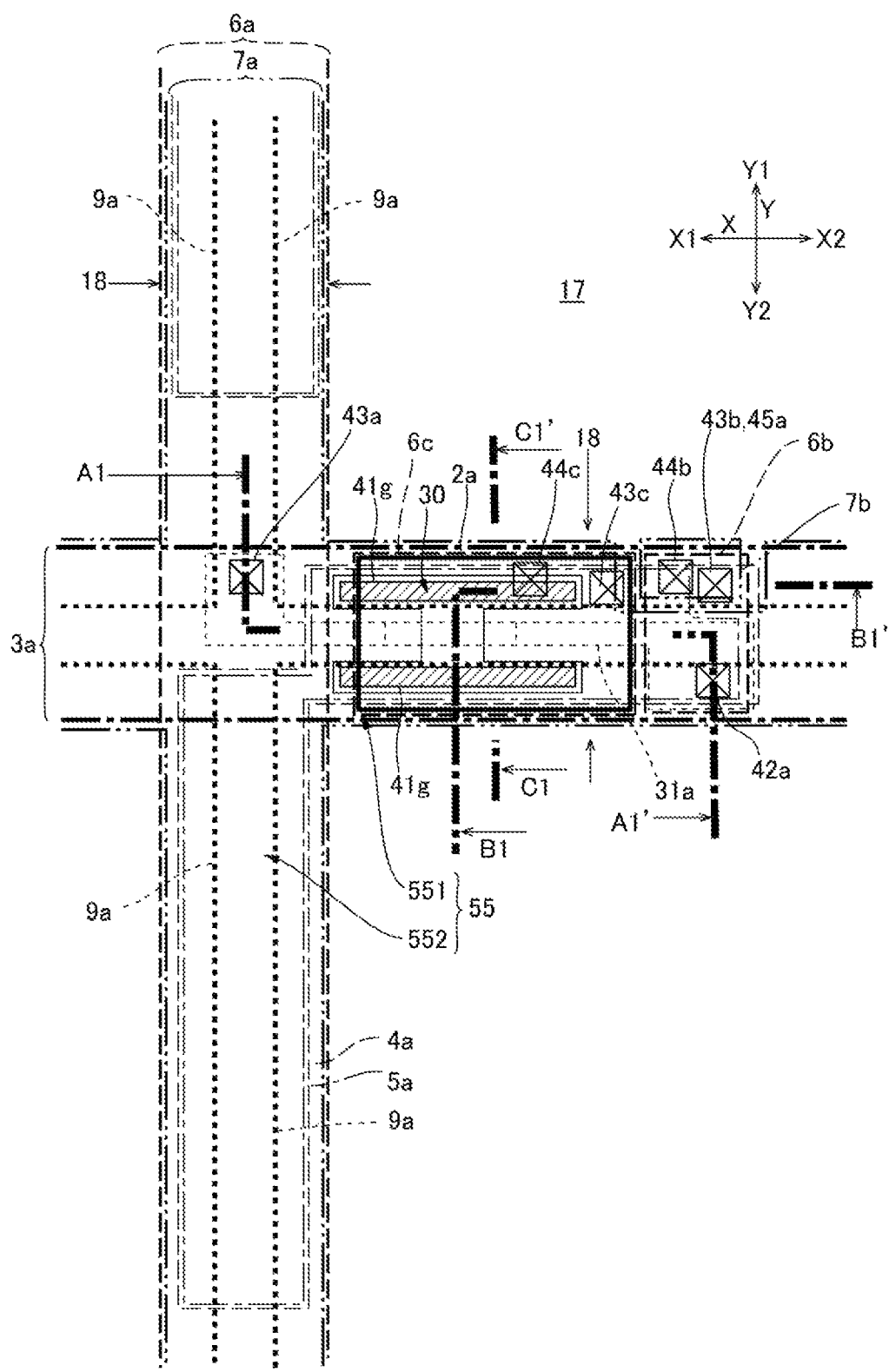
FIG. 4 is an enlarged plan view illustrating one of the pixels illustrated in FIG. 3.
Figure 5:
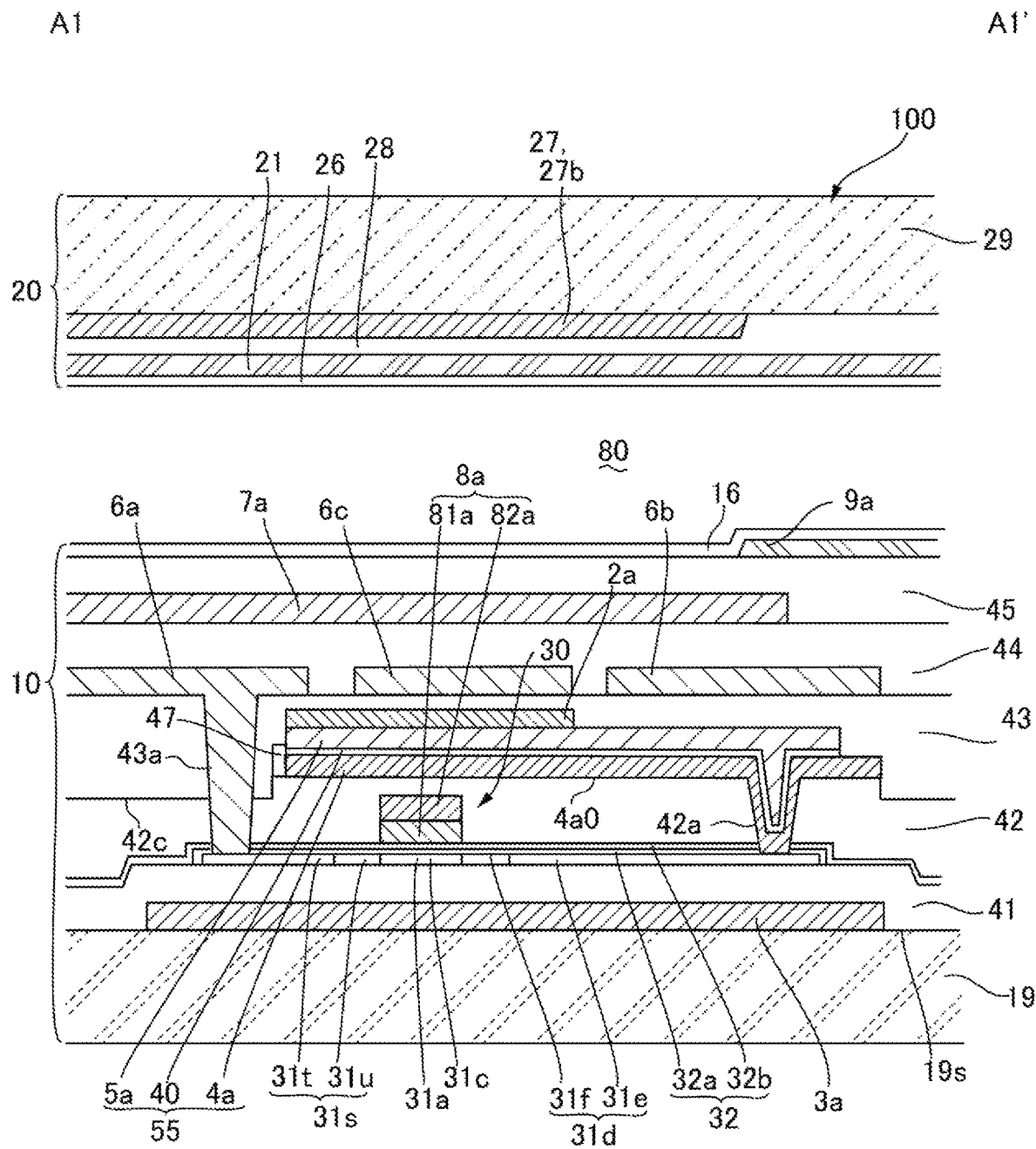
FIG. 5 is an A1-A1' cross-sectional view of FIG. 4.
Figure 6:
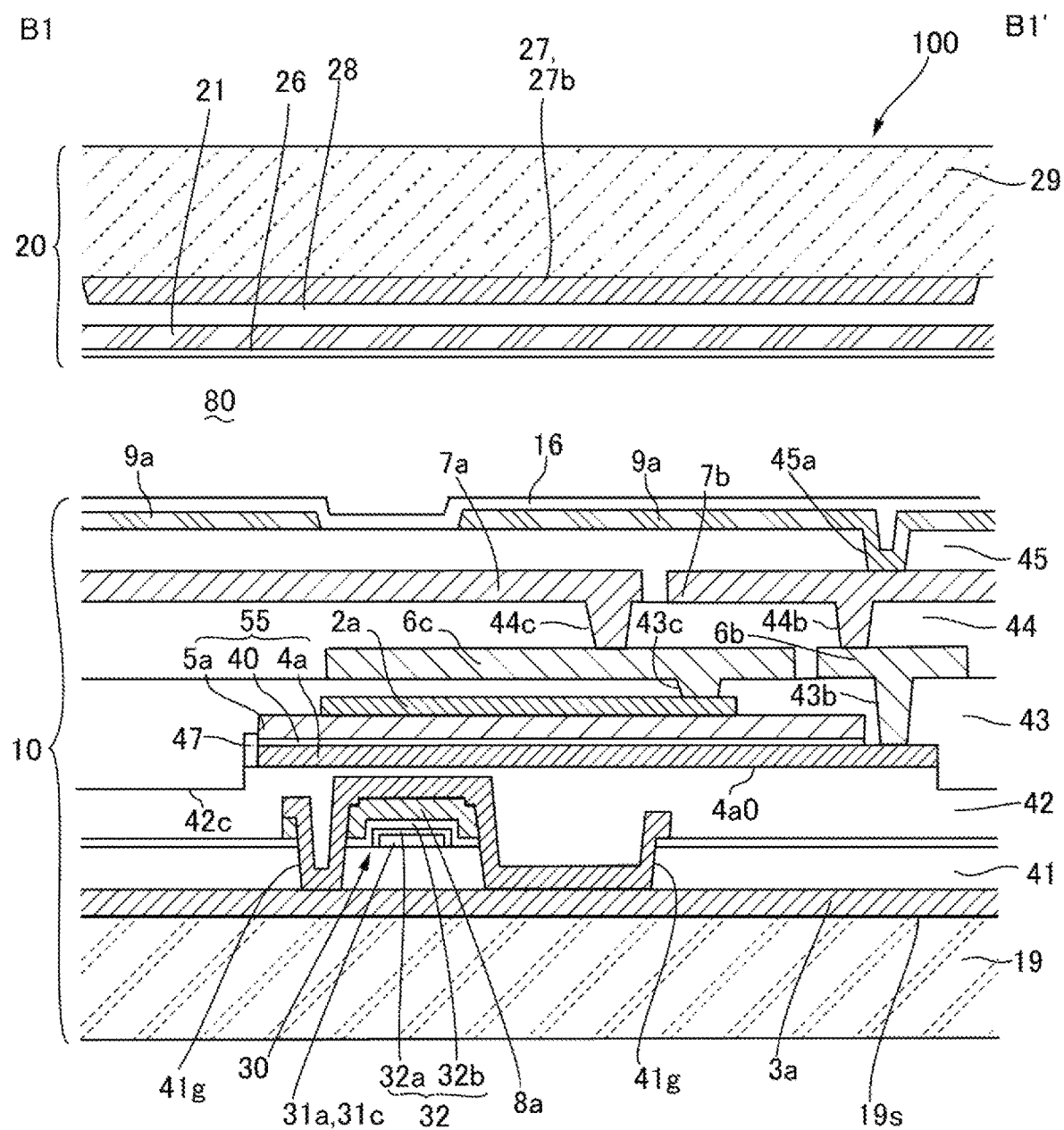
FIG. 6 is a B1-B1' cross-sectional view of FIG. 4.
Figure 7:
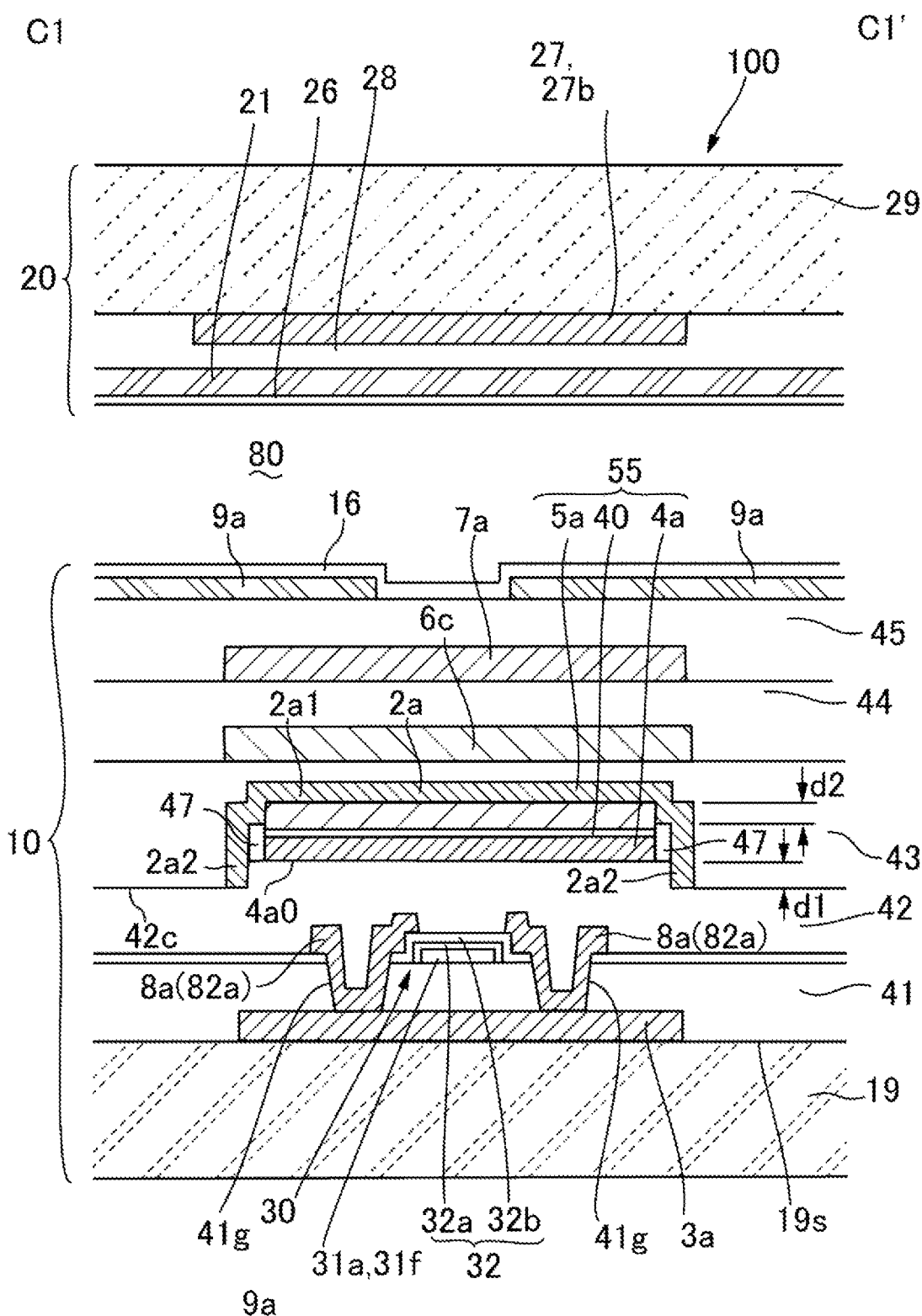
FIG. 7 is a C1-C1' cross-sectional view of FIG. 4.

FIG. 3 is a plan view of the plurality of pixels adjacent to each other in the electro-optical device 100 illustrated in FIG. 1. FIG. 4 is an enlarged plan view illustrating one of the pixels illustrated in FIG. 3, and in FIG. 4, a vicinity of a transistor 30 is enlarged and illustrated. FIG. 5 is the A1-A1' cross-sectional view of FIG. 4. FIG. 6 is the B1-B1' cross-sectional view of FIG. 4. FIG. 7 is the C1-C1' cross-sectional view of FIG. 4. Note that, in FIG. 3 and FIG. 4, and FIG. 8 to FIG. 10 to be described later, layers are indicated by the lines below. Further note that in FIG. 3 and FIG. 4, and FIG. 8 to FIG. 10 described below, respective positions of end portions are shifted, for layers whose end portions are mutually overlapped in plan view, to make a shape and the like of the layer easily recognizable. In addition, a contact hole 41g is illustrated with a region hatched with oblique lines raising to the right.

A scan line 3a=a thick alternate long and short dash line

A semiconductor layer 31a=a thin and short broken line

A gate electrode 8a=a thin solid line

A first capacitance electrode 4a=a thin and long dashed line

A second capacitance electrode 5a=a thin alternate long and short dash line

A light shielding layer 2a=a thick solid line

The data line 6a and relay electrodes 6b and 6c=thick and long dashed lines

A capacitance line 7a and a relay electrode 7b=thick two-dot chain lines

The pixel electrode 9a=a thick short dashed line

As illustrated in FIG. 3 and FIG. 4, the pixel electrode 9a is formed at each of the plurality of pixels on a surface of the first substrate 10 facing the second substrate 20, where the scan line 3a, the data line 6a, and the capacitance line 7a extend along an inter-pixel region between the pixel electrodes 9a adjacent to each other. The data line 6a extends in the second direction Y in the inter-pixel region. The scan line 3a extends in the first direction X in the inter-pixel region. The capacitance line 7a extends along the second direction Y and the first direction X in the inter-pixel region. Further, the transistor 30 is formed corresponding to an intersection between the data line 6a and the scan line 3a. Here, the scan line 3a, the data line 6a, and the capacitance line 7a each have a light shielding property. Accordingly, a region in which the scan line 3a, the data line 6a, the capacitance line 7a, and an electrode in the same layer as these wiring lines are formed is a light shielding region 18 through which light does not transmit, and a region surrounded by the light shielding region 18 is an aperture region 17 through which light transmits.

As illustrated in FIG. 5, FIG. 6, and FIG. 7, the first substrate 10 includes the transistor 30 including the semiconductor layer 31a in a layer between the substrate body 19 and the pixel electrode 9a, a first interlayer insulating layer 42 provided in a layer between the transistor and the pixel electrode 9a, and a capacitance element 55, the capacitance element 55 includes a first capacitance electrode 4a overlapping with the semiconductor layer 31a in a layer between a first interlayer insulating layer 42 and the pixel electrode 9a, and a second capacitance electrode 5a overlapping with the first capacitance electrode 4a via a dielectric film 40 in a layer between the first capacitance electrode 4a and the pixel electrode 9a. In the first substrate 10, the scan line 3a extends in the first direction X in a layer between the substrate body 19 and the semiconductor layer 31a, and the data line 6a extends in the second direction Y in a layer between the second capacitance electrode 5a and the pixel electrode 9a. Further, an interlayer insulating layer 41, the first interlayer insulating layer 42, a second interlayer insulating layer 43, and an interlayer insulating layers 44 and 45 are stacked in order between the substrate body 19 and the pixel electrode 9a. The first interlayer insulating layer 42, the second interlayer insulating layer 43, and the interlayer insulating layers 41, 44, and 45 each include a transmissive insulating film such as silicon oxide. In the present exemplary embodiment, a surface on the pixel electrode 9a side of each of the second interlayer insulating layer 43, the interlayer insulating layers 44, and 45 is formed as a continuous plane by chemical mechanical polishing or the like.

3. Detailed Description of Each Layer

Figure 8:
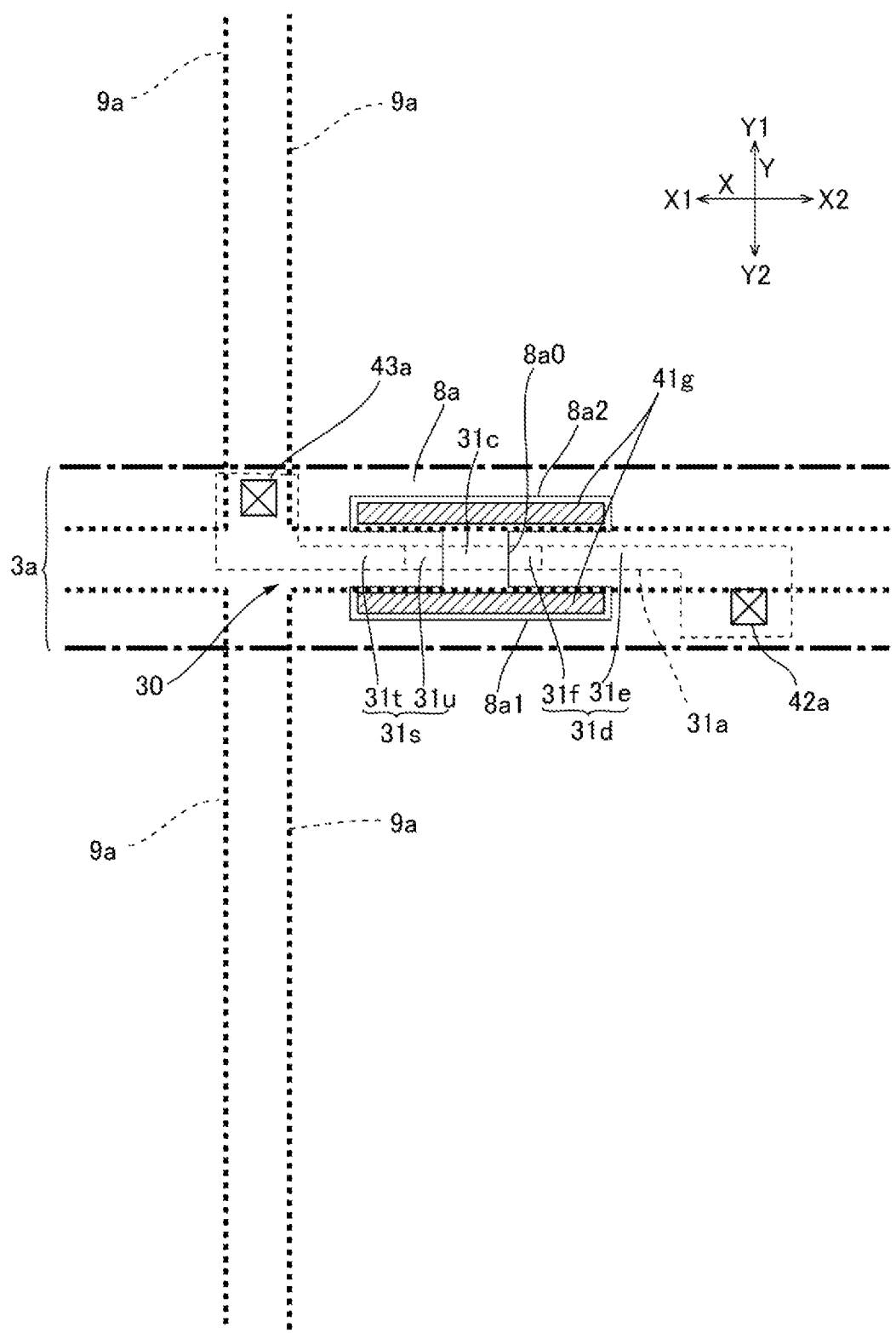
FIG. 8 is a plan view of a scan line, a semiconductor layer, a gate electrode, and the like illustrated in FIG. 4.
Figure 9:
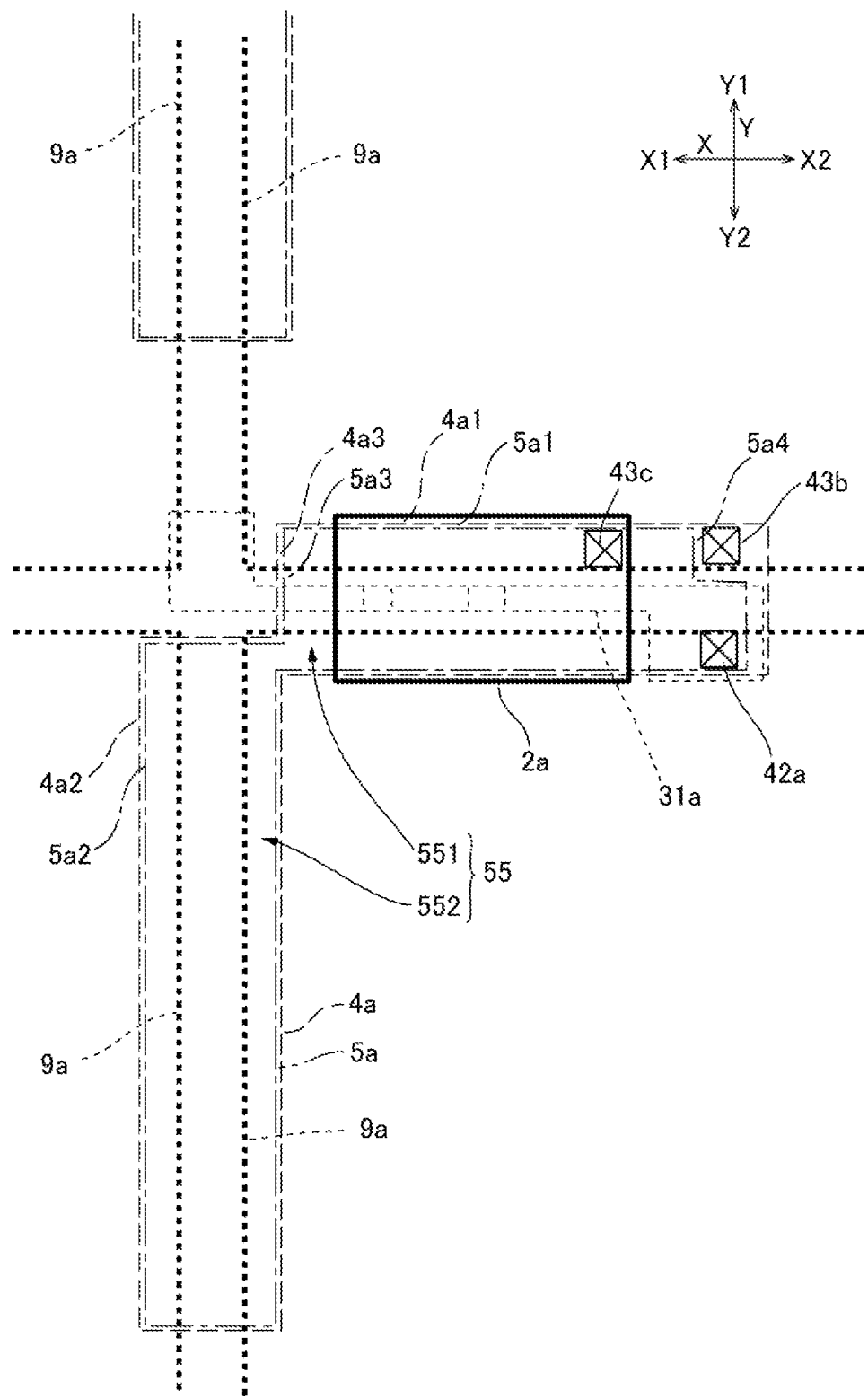
FIG. 9 is a plan view of a first capacitance electrode, a second capacitance electrode, and the like illustrated in FIG. 4.
Figure 10:
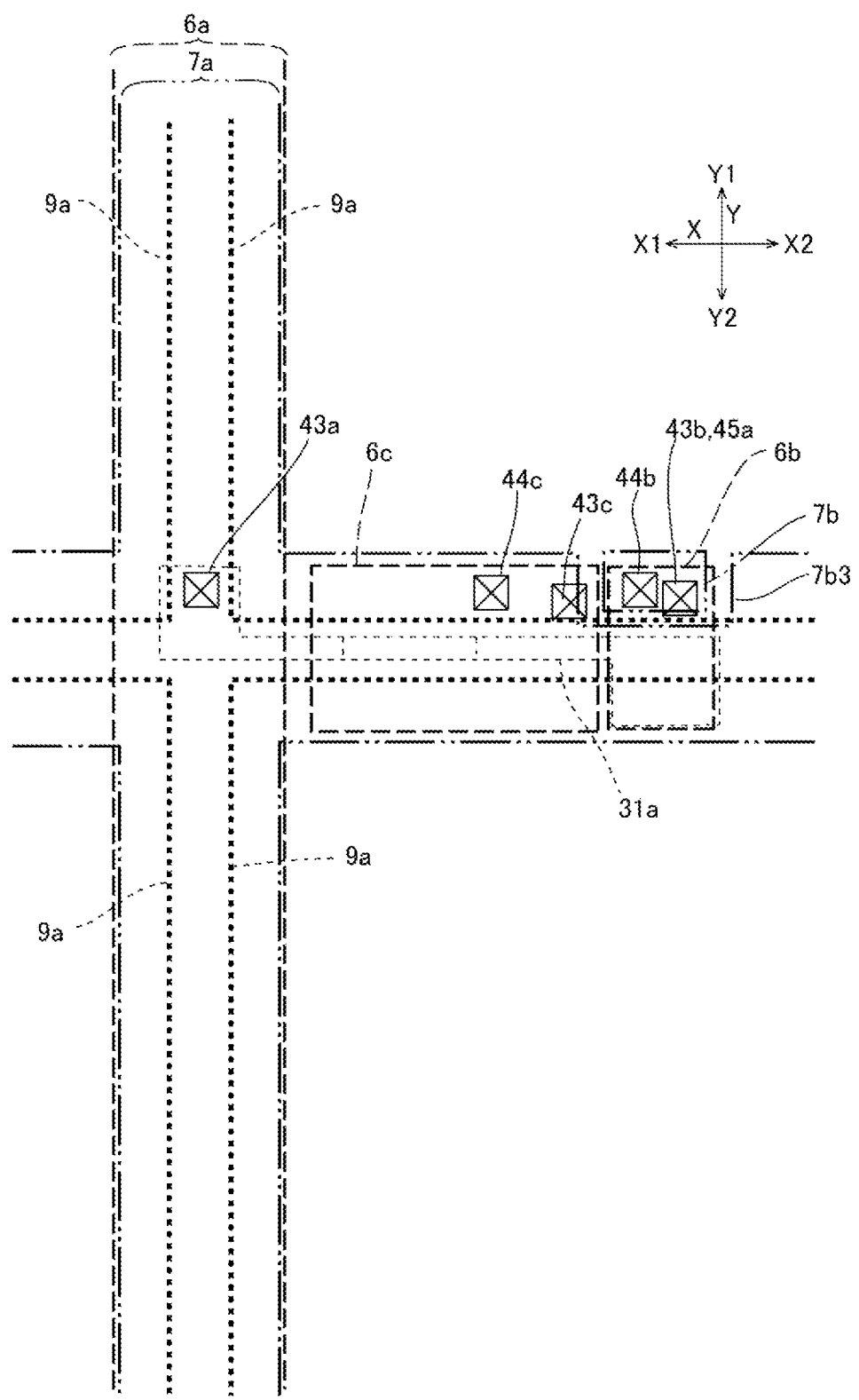
FIG. 10 is a plan view of a data line, a capacitance line, and the like illustrated in FIG. 4.

A detailed configuration of the first substrate 10 will be described with reference FIG. 5, FIG. 6, and FIG. 7, while referring to FIG. 8 to FIG. 10 described below as necessary. FIG. 8 is a plan view of the scan line 3a, the semiconductor layer 31a, the gate electrode 8a, and the like illustrated in FIG. 4. FIG. 9 is a plan view of the first capacitance electrode 4a, the second capacitance electrode 5a, and the like illustrated in FIG. 4. FIG. 10 is a plan view illustrating the data line 6a, the capacitance line 7a, and the like illustrated in FIG. 4. Note that, FIG. 8 to FIG. 10 each illustrate a contact hole related to electrical coupling of the electrodes and the like illustrated in those drawings, and each illustrate the semiconductor layer 31a and the pixel electrode 9a for indicating a position to be referenced.

First, as illustrated in FIG. 5, FIG. 6, and FIG. 7, in the first substrate 10, the scan line 3a extending along the first direction X is formed between the substrate body 19 and the interlayer insulating layer 41. The scan line 3a is formed of a light shielding conductive film such as a metal silicide film, a metal film, or a metal compound film. In the present exemplary embodiment, the scan line 3a is formed of tungsten silicide (WSi), tungsten, or titanium nitride.

Between the interlayer insulating layer 41 and the first interlayer insulating layer 42 is formed the transistor 30 for pixel switching. The transistor 30 includes the semiconductor layer 31a formed at a surface of the interlayer insulating layer 41 on an opposite side to the substrate body 19, a gate insulating film 32 stacked on the pixel electrode 9a side of the semiconductor layer 31a, and the gate electrode 8a overlapping in plan view with the semiconductor layer 31a on the pixel electrode 9a side of the gate insulating film 32. The semiconductor layer 31a includes, for example, a poly-silicon film. The gate insulating film 32 has two-layer structure including a first gate insulating film 32a including a silicon oxide film that is obtained by thermally oxidizing the semiconductor layer 31a, and a second gate insulating film 32b including a silicon oxide film that is formed by using, for example, a low-pressure CVD method. The gate electrode 8a is formed of a conductive film such as a conductive polysilicon film, a metal silicide film, a metal film, or a metal compound film.

The contact hole 41g for electrically coupling the scan line 3a and the gate electrode 8a of the transistor 30 is provided in the interlayer insulating layer 41. A detailed configuration of such a contact hole 41g will be described below with reference to FIG. 11.

As illustrated in FIG. 8, the scan line 3a extends linearly along the first direction X with the same width dimension. The semiconductor layer 31a extends from an intersecting portion of the scan line 3a and the data line 6a to the other side X2 in the first direction X, and overlaps with the scan line 3a in plan view. A portion of the semiconductor layer 31a overlapping in plan view with the gate electrode 8a is a channel region 31c. In the present exemplary embodiment, the transistor 30 has lightly doped drain (LDD) structure.

Accordingly, in the semiconductor layer 31a, a data line side source drain region 31s on the one side X1 in the first direction X in which the data line 6a is positioned with respect to the channel region 31c includes a first region 31t spaced apart from the channel region 31c, and a first low concentration region 31u sandwiched between the first region 31t and the channel region 31c, and the first low concentration region 31u has a lower impurity concentration than that of the first region 31t. In addition, in the semiconductor layer 31a, a pixel electrode side source drain region 31d on the other side X2 in the first direction X opposite to the data line 6a with respect to the channel region 31c includes a second region 31e spaced apart from the channel region 31c, and a second low concentration region 31f sandwiched between the second region 31e and the channel region 31c, and the second low concentration region 31f has a lower impurity concentration than that of the second region 31e.

The gate electrode 8a includes a first electrode portion 8a0 extending in the second direction Y so as to overlap in plan view with the semiconductor layer 31a via the gate insulating film 32, and second electrode portions 8a1 and 8a2 extending in the first direction X along the semiconductor layer 31a from respective end portions on both sides of the first electrode portion 8a0 in the second direction Y on both sides in the second direction y of the semiconductor layer 31a, and the second electrode portions 8a1 and 8a2 do not overlap in plan view with the semiconductor layer 31a.

In FIG. 5, FIG. 6, and FIG. 7, the capacitance element 55 is provided in which the first capacitance electrode 4a, the dielectric film 40, and the second capacitance electrode 5a are stacked in order, between the first interlayer insulating layer 42 and the second interlayer insulating layer 43 on an upper layer side of the transistor 30. The capacitance element 55 is a retention capacitor that prevents a fluctuation in an image signal retained by a liquid crystal capacitor configured between the pixel electrode 9a of the first substrate 10 and the common electrode 21 of the second substrate 20. The first capacitance electrode 4a and the second capacitance electrode 5a are each formed of a conductive film such as a conductive polysilicon film, a metal silicide film, a metal film, or a metal compound film. In the present exemplary embodiment, the first capacitance electrode 4a and the second capacitance electrode 5a are each a conductive polysilicon film.

As illustrated in FIG. 9, the first capacitance electrode 4a includes a body portion 4a1 that extends in the first direction X so as to overlap in plan view with the scan line 3a and the semiconductor layer 31a, and a protruding portion 4a2 that protrudes from the body portion 4a1 so as to overlap in plan view with the data line 6a, and an end portion of the body portion 4a1 is electrically coupled to the second region 31e of the semiconductor layer 31a via a contact hole 42a formed in the first interlayer insulating layer 42. Of the semiconductor layer 31a, the first capacitance electrode 4a has a notch 4a3 formed so as to not overlap with an end portion overlapping with the data line 6a in plan view.

The second capacitance electrode 5a includes a body portion 5a1 that overlaps with a body portion 5a1 of the first capacitance electrode 4a in plan view, and a protruding portion 5a2 that overlaps with the protruding portion 4a2 of the first capacitance electrode 4a in plan view. Accordingly, the capacitance element 55 includes a first element portion 551 extending in the first direction X so as to overlap with the semiconductor layer 31a, and a second element portion 552 that extends in the second direction Y so as to overlap with the data line 6a from an intersecting portion of the first element portion 551 and the data line 6a. In addition, the second capacitance electrode 5a, similar to the first capacitance electrode 4a, has a notch 4a3 formed in the semiconductor layer 31a so as not to overlap with an end portion overlapping with the data line 6a in plan view. Also, a notch 5a4 is formed in an end portion of the body portion 5a1 of the second capacitance electrode 5a on the other side X2 in the first direction X, so as not to overlap with an end portion of the body portion 4a1 of the first capacitance electrode 4a.

In FIG. 5, FIG. 6, and FIG. 7, the interlayer insulating layers 44 and 45 are formed on an upper layer side of the second interlayer insulating layer 43. The data line 6a and the relay electrodes 6b and 6c are provided in an interlayer between the second interlayer insulating layer 43 and the interlayer insulating layer 44. The data line 6a, and the relay electrodes 6b and 6c are each formed of the same conductive film. Any of the data line 6a, the relay electrodes 6b, and 6c includes a light shielding conductive film such as a metal silicide film, a metal film, or a metal compound film. For example, the data line 6a, the relay electrodes 6b, and 6c are each formed by multilayer structure of titanium layer/titanium nitride layer/aluminum layer/titanium nitride layer, or multilayer structure of titanium nitride layer/aluminum layer/titanium nitride layer.

A contact hole 43a is provided in the first interlayer insulating layer 42 and the second interlayer insulating layer 43, and the contact hole 43a extends through the gate insulating film 32, the first interlayer insulating layer 42, and the second interlayer insulating layer 43. The data line 6a is electrically coupled to the first region 31t via the contact hole 43a. The contact hole 43a is formed in a portion corresponding to the notch 4a3 of the first capacitance electrode 4a, and the notch 5a3 of the second capacitance electrode 5a described with reference to FIG. 9. Accordingly, the contact hole 43a and the capacitance element 55 can be separated. A contact hole 43b is provided in the second interlayer insulating layer 43, and the contact hole 43b extends through the second interlayer insulating layer 43. The relay electrode 6b is electrically coupled to the first capacitance electrode 4a via a contact hole 43b. The contact hole 43b is formed in a portion corresponding to the notch 5a4 of the second capacitance electrode 5a described with reference to FIG. 9. A contact hole 43c is provided in the second interlayer insulating layer 43, and the relay electrode 6c is electrically coupled to the second capacitance electrode 5a via a contact hole 43c. The relay electrode 6c covers at least from the first low concentration region 31u to the second low concentration region 31f of the semiconductor layer 31a from the pixel electrode 9a side.

In the present exemplary embodiment, as described below, the first substrate 10 includes the conductive light shielding layer 2a including a first portion 2a1 that overlaps with a surface of the second capacitance electrode 5a on the pixel electrode 9a side. Further, the relay electrode 6c is electrically coupled to the light shielding layer 2a via the contact hole 43c, and is electrically coupled to the second capacitance electrode 5a via the light shielding layer 2a. The light shielding layer 2a further includes a second portion 2a2 for increasing a light shielding property.

The capacitance line 7a and the relay electrode 7b are provided in an interlayer between the interlayer insulating layer 44 and the interlayer insulating layer 45. The capacitance line 7a and the relay electrode 7b are each formed of the same conductive film. Any of the capacitance line 7a, and the relay electrode 7b includes a light shielding conductive film such as a metal silicide film, a metal film, or a metal compound film. For example, the capacitance line 7a, and the relay electrode 7b are each formed by multilayer structure of titanium layer/titanium nitride layer/aluminum layer/titanium nitride layer, or multilayer structure of titanium nitride layer/aluminum layer/titanium nitride layer.

A contact hole 44c is provided in the interlayer insulating layer 44, and the capacitance line 7a is electrically coupled to the relay electrode 6c via the contact hole 44c. Therefore, the capacitance line 7a is electrically coupled to the second capacitance electrode 5a via the relay electrode 6c, and a constant potential, such as common potential, is applied to the second capacitance electrode 5a from the capacitance line 7a. A contact hole 44b is provided in the interlayer insulating layer 44, and the relay electrode 7b is electrically coupled to the relay electrode 6b via the contact hole 44b.

A contact hole 45a is formed in the interlayer insulating layer 45, and the pixel electrode 9a is electrically coupled to the relay electrode 7b via the contact hole 45a. Thus, the pixel electrode 9a is electrically coupled to the first capacitance electrode 4a via the relay electrodes 7b and 6b. Here, since the first capacitance electrode 4a is electrically coupled to the second region 31e via the contact hole 42a, the pixel electrode 9a is electrically coupled to the second region 31e via the first capacitance electrode 4a.

4. Configuration Around Contact Hole 41g

Figure 11:
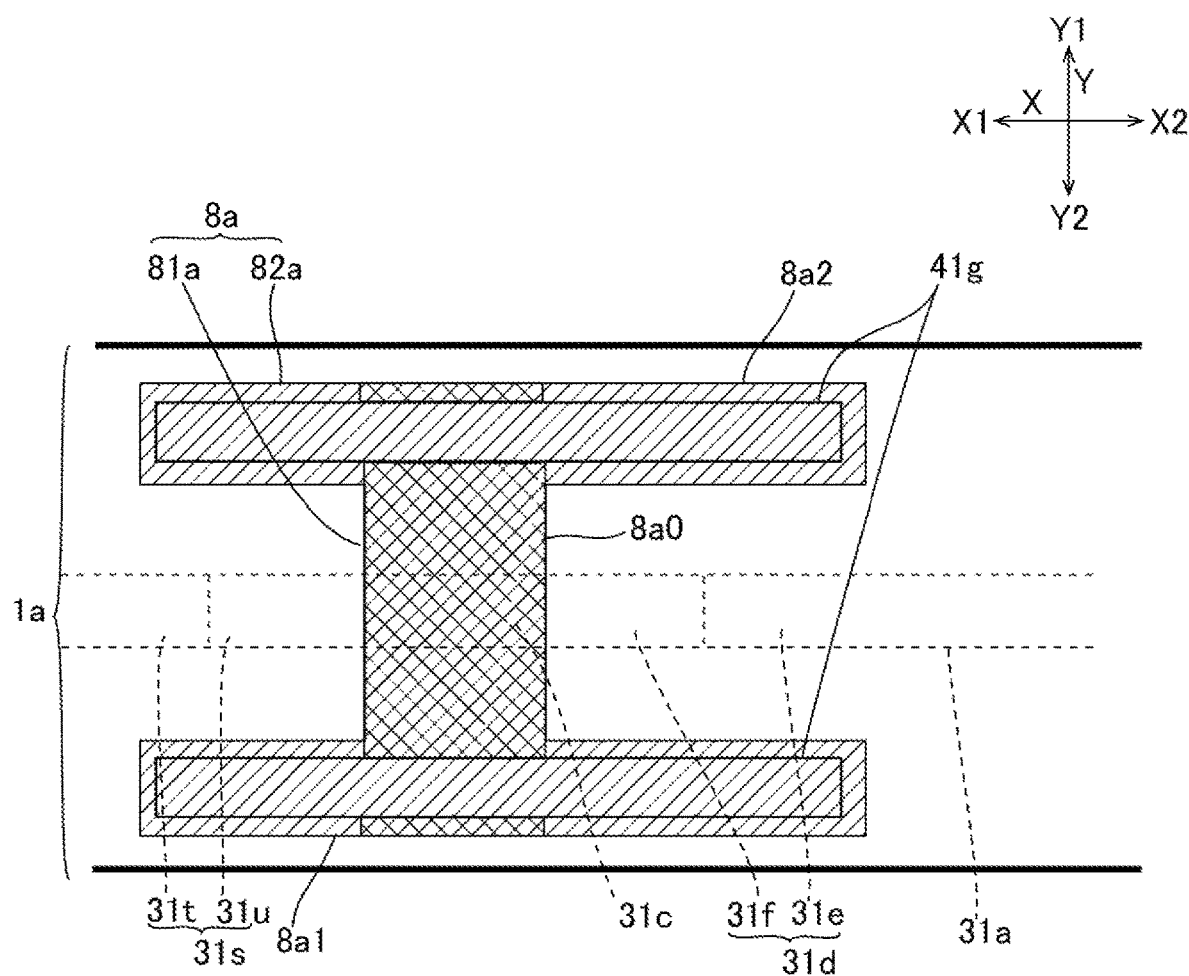
FIG. 11 is an enlarged plan view illustrating a periphery of a contact hole illustrated in FIG. 8.

FIG. 11 is an enlarged plan view illustrating a periphery of the contact hole 41g illustrated in FIG. 8. The gate electrode 8a is formed by stacking a polysilicon film 81a and a light shielding layer 82a. In FIG. 11, the polysilicon film 81a is hatched with oblique lines lowering to the right, and the light shielding layer 82a is hatched with oblique lines rising to the right. Therefore, a region hatched with oblique lines lowering to the right and oblique lines rising to the right indicates that the polysilicon film 81a and the light shielding layer 82a are stacked.

As illustrated in FIG. 11, the contact hole 41g extends along the first direction X on both sides of the semiconductor layer 31a, and overlaps with both the gate electrode 8a and the scan line 3a in plan view. Accordingly, the gate electrode 8a is electrically coupled to the scan line 3a via the contact hole 41g, and thus a scanning signal is applied from the scan line 3a.

The contact hole 41g is provided at least along the second low concentration region 31f. In the present exemplary embodiment, the contact hole 41g extends at least from both sides of the first low concentration region 31u, through both sides of the channel region 31c, to both sides of the second low concentration region 31f.

In the present exemplary embodiment, the gate electrode 8a is configured by stacking the conductive polysilicon film 81a extending in the second direction Y so as to intersect the semiconductor layer 31a, and the light shielding layer 82a covering the polysilicon film 81a. The light shielding layer 82a is formed from a material having a higher light shielding property than that of the polysilicon film 81a. For example, the light shielding layer 82a is formed from a light shielding conductive film such as tungsten silicide.

The light shielding layer 82a is formed over a wider area than the polysilicon film 81a, and covers the entire polysilicon film 81a. Therefore, in a region in the gate electrode 8a where the polysilicon film 81a is formed, the polysilicon film 81a and the light shielding layer 82a are formed in two-layer structure, and in a region in the gate electrode 8a where the polysilicon film 81a is not formed, the light shielding layer 82a is formed in single layer structure. For example, in the gate electrode 8a, the polysilicon film 81a is not formed inside the contact hole 41g, and the light shielding layer 82a is formed in single layer structure. Accordingly, the light shielding layer 82a is provided along an entire side surface of the contact hole 41g. In contrast, of the first electrode portion 8a0 extending in the second direction Y in the gate electrode 8a, in a portion outside the contact hole 41g, the polysilicon film 81a and the light shielding layer 82a is formed in two-layer structure.

Such a configuration is achieved by the following processes. First, the scan line 3a, the interlayer insulating layer 41, the semiconductor layer 31a, and the gate insulating film 32 are formed. Next, after a conductive polysilicon film is formed, the polysilicon film is patterned to form the polysilicon film 81a extending in the second direction Y intersecting the semiconductor layer 31a.

Next, with an etching mask formed, the polysilicon film 81a and the interlayer insulating layer 41 are etched to form the contact hole 41g. Therefore, the polysilicon film 81a is not present inside the contact hole 41g. Next, after a light shielding layer is formed, the light shielding layer is patterned to form the light shielding layer 82a, as illustrated in FIG. 10.

5. Light Shielding by Light Shielding Layer 2a

As illustrated in FIG. 5, FIG. 6, FIG. 7, and FIG. 9, in the first substrate 10, the conductive light shielding layer 2a including the first portion 2a1 that overlaps with the second capacitance electrode 5a is provided between the second capacitance electrode 5a and the second interlayer insulating layer 43, in a layer between the first element portion 551 of the second capacitance electrode 5a and the pixel electrode 9a. The light shielding layer 2a is formed of a light shielding conductive film such as a metal silicide film, a metal film, or a metal compound film.

In the present exemplary embodiment, the light shielding layer 2a includes the second portion 2a2 that protrudes from an end portion of the first portion 2a1 that overlaps with the second capacitance electrode 5a, at least separated from the first capacitance electrode 4a, along a side surfaces of the second capacitance electrode 5a and the first capacitance electrode 4a, toward the semiconductor layer 31a side. As illustrated in FIG. 7, at least the light shielding layer 2a includes the second portion 2a2 that protrudes from an end portion of the first portion 2a1 in the second direction Y, toward both sides in a width direction of the semiconductor layer 31a through a side of the second capacitance electrode 5a and the first capacitance electrode 4a.

The first portion 2a1 is stacked on a surface of the second capacitance electrode 5a on the pixel electrode 9a side, and is electrically coupled to the second capacitance electrode 5a. Here, an insulating film 47 covering the side surface of the first capacitance electrode 4a is provided at the first substrate 10, and the second portion 2a2 overlaps with the insulating film 47 from a side opposite the first capacitance electrode 4a. In the present exemplary embodiment, the insulating film 47 is a side wall that does not overlap with the second capacitance electrode 5a in plan view, and covers the side surface of the first capacitance electrode 4a and a side surface of the dielectric film 40 between the first interlayer insulating layer 42 and the second interlayer insulating layer 43, and the second portion 2a2 overlaps with the insulating film 47 from a side opposite the first capacitance electrode 4a. Further, an end portion of the second portion 2a2 protrudes from a surface 4a0 on the semiconductor layer 31a side of the first capacitance electrode 4a toward the semiconductor layer 31a side.

In a manufacturing process of the electro-optical device 100 having such structure, the first capacitance electrode 4a, the dielectric film 40, and the second capacitance electrode 5a are formed at a surface of the first interlayer insulating layer 42 on the pixel electrode 9a side, and then collectively patterned to form the capacitance element 55. Next, after the insulating film 47 is formed, anisotropic etching is performed on the insulating film 47, and the insulating film 47 overlapping with the first interlayer insulating layer 42 and the second capacitance electrode 5a is removed. Anisotropic etching is further performed on the insulating film 47, thereby exposing a side surface of the second capacitance electrode 5a. During such etching, the first interlayer insulating layer 42 acts as an etching stopper. As a result, as illustrated in FIG. 7, the insulating film 47 remains as a side wall covering the side surface of the first capacitance electrode 4a and the side surface of the dielectric film 40, while exposing the side surface of the second capacitance electrode 5a.

In addition, in a surface of the first interlayer insulating layer 42 on the pixel electrode 9a side, a region exposed from the insulating film 47 and the capacitance element 55 becomes a recessed portion 42c recessed from a region overlapping with the insulating film 47 and the capacitance element 55 toward the semiconductor layer 31a side. Thus, after a light shielding layer is formed, and the light shielding layer is patterned to form the light shielding layer 2a, the second portion 2a2 that protrudes toward the semiconductor layer 31a side from the surface 4a0 on the semiconductor layer 31a side of the first capacitance electrode 4a to a position contacting a bottom of the recessed portion 42c, is formed at the light shielding layer 2a. In addition, a dimension d1 of the second portion 2a2 that protrudes from the surface 4a0 on the semiconductor layer 31a side of the first capacitance electrode 4a toward the semiconductor layer 31a side is equal to a depth of the recessed portion 42c. Accordingly, the dimension d1 is a dimension equal to a thickness d2 of a portion of the second capacitance electrode 5a that protrudes from the insulating film 47 to the pixel electrode 9a side, or a dimension greater than the thickness d2 of the portion of the second capacitance electrode 5a that protrudes from the insulating film 47 to the pixel electrode 9a side.

As can be seen from FIG. 4, a width in the second direction Y of the light shielding layer 2a is greater than a width in the second direction Y of the first element portion 551, and is less than a width in the second direction Y of the scan line 3a.

Note that, during the process described above or after the process described above, the dielectric film 40 and the second capacitance electrode 5a are removed by etching from a position of the first capacitance electrode 4a where the contact hole 43b is to be formed.

6. Main Effects of the Present Exemplary Embodiment

As described above, in the electro-optical device 100 of the present exemplary embodiment, the conductive light shielding layer 2a is provided at the first substrate 10 between the second capacitance electrode 5a and the second interlayer insulating layer 43, in the layer between the second capacitance electrode 5a and the pixel electrode 9a. The light shielding layer 2a includes the second portion 2a2 that protrudes from the end portion in the second direction Y of the first portion 2a1 through the side of the first capacitance electrode 4a toward both the sides in the width direction of the semiconductor layer 31a. Thus, of light incident on the first substrate 10 from the second substrate 20 side, light that attempts to proceed toward the semiconductor layer 31a through between the gate electrode 8a and the capacitance element 55 can be shielded by the second portion 2a2 of the light shielding layer 2a. Therefore, incidence of light on the semiconductor layer 31a is suppressed. In particular, because the second portion 2a2 protrudes toward the semiconductor layer 31a from the surface 4a0 on the semiconductor layer 31a side of the first capacitance electrode 4a, so incidence of light on the semiconductor layer 31a can be further suppressed.

In addition, because the light shielding layer 2a is a film different from the second capacitance electrode 5a, structure that does not generate a short circuit between the first capacitance electrode 4a and the second capacitance electrode 5a can be employed. More specifically, the light shielding layer 2a is electrically coupled to the second capacitance electrode 5a, but the side wall insulating film 47 is interposed between the light shielding layer 2a and the first capacitance electrode 4a. Therefore, even when the light shielding layer 2a is provided, a short circuit is not generated between the first capacitance electrode 4a and the second capacitance electrode 5a.

In addition, the width in the second direction Y of the light shielding layer 2a is greater than the width in the second direction Y of the first element portion 551, and is less than the width in the second direction Y of the scan line 3a, so even when the light shielding layer 2a is formed, a pixel opening ratio will not be reduced.

Furthermore, light incident from the second substrate 20 side is shielded by the data line 6a, the relay electrode 6c, the capacitance line 7a, and the like provided on the second substrate 20 side with respect to the semiconductor layer 31a, so incidence on the semiconductor layer 31a is suppressed. Further, even when light emitted from the first 10 side is incident again from the first 10 side, the light is shielded by the scan line 3a provided on the substrate body 19 side with respect to the semiconductor layer 31a, and thus incidence on the semiconductor layer 31a is suppressed. In addition, light traveling in the second direction Y intersecting the semiconductor layer 31a is shielded by the light shielding conductive film formed by the light shielding layer 82a inside the contact hole 41g that electrically couples the gate electrode 8a and the scan line 3a, so incidence on the semiconductor layer 31a is suppressed. In particular, in the present exemplary embodiment, by providing the second low concentration region 31f between the channel region 31c and the second region 31e, an off leakage current of the transistor 30 is reduced, and the contact hole 41g is provided along at least the second low concentration region 31f. Thus, light traveling in the second direction Y intersecting the semiconductor layer 31a toward the second low concentration region 31f can be shielded by the gate electrode 8a inside the contact hole 41g. Therefore, incidence of light on the second low concentration region 31f is efficiently suppressed. Thus, the transistor 30 can sufficiently exhibit characteristics due to LDD structure.

Further, the gate electrode 8a includes the conductive polysilicon film 81a and the light shielding layer 82a, and the light shielding layer 82a is provided along the side surface of the contact hole 41g. Therefore, the gate electrode 8a has a high light shielding property.

Exemplary Embodiment 2

Figure 12:
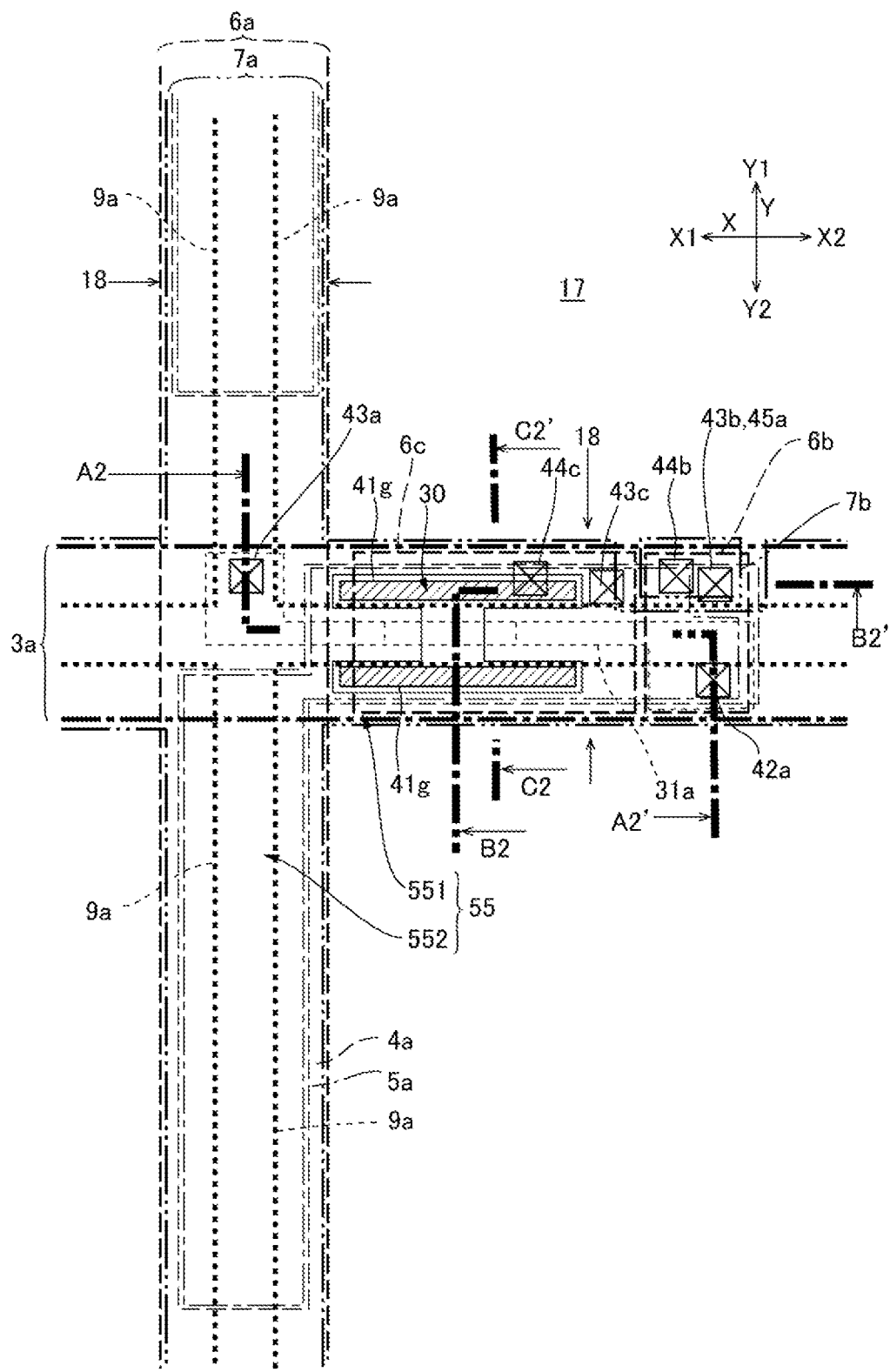
FIG. 12 is an explanatory diagram of an electro-optical device according to Exemplary Embodiment 2 of the present disclosure.
Figure 13:
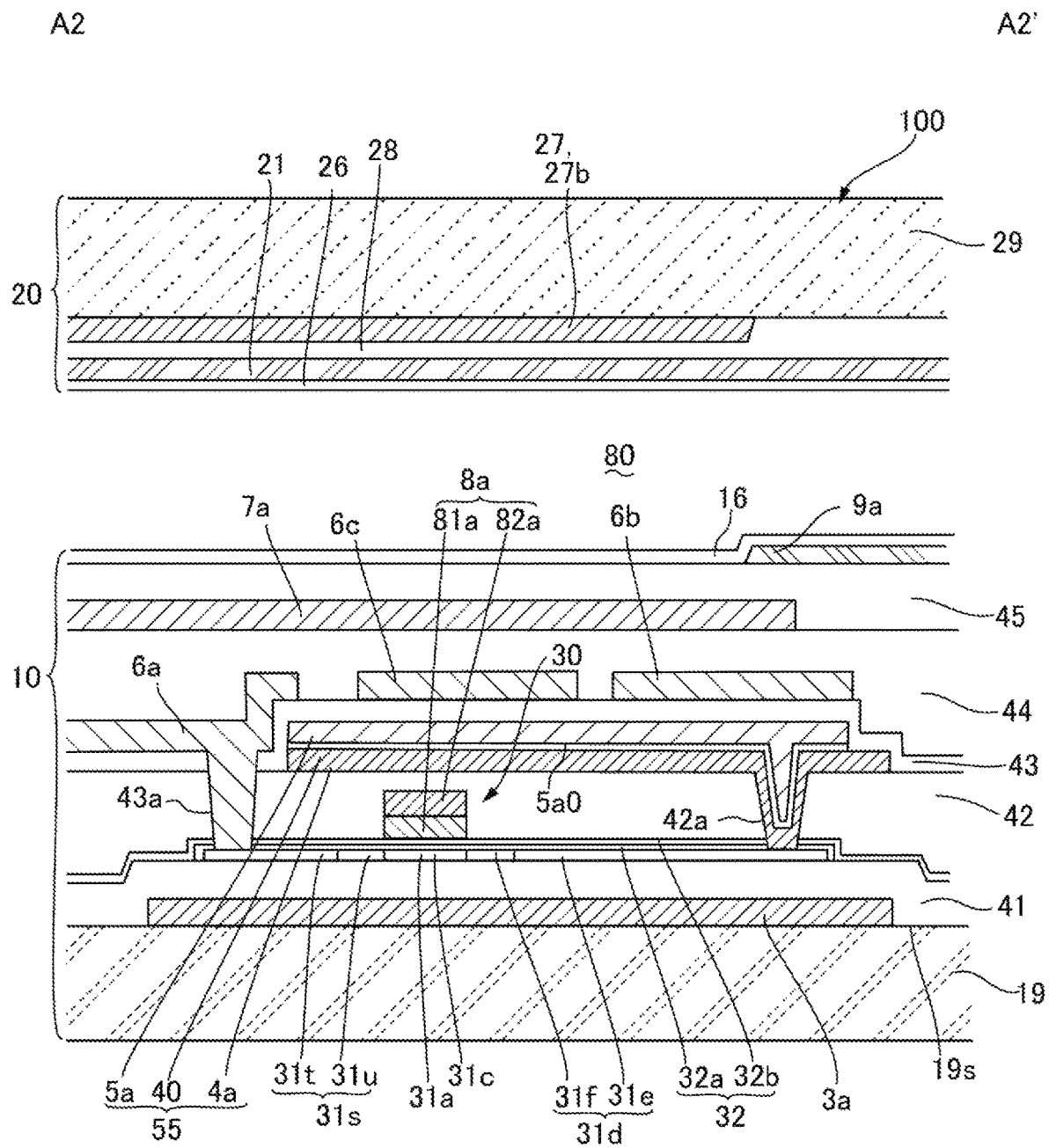
FIG. 13 is an A2-A2' cross-sectional view of FIG. 12.
Figure 14:
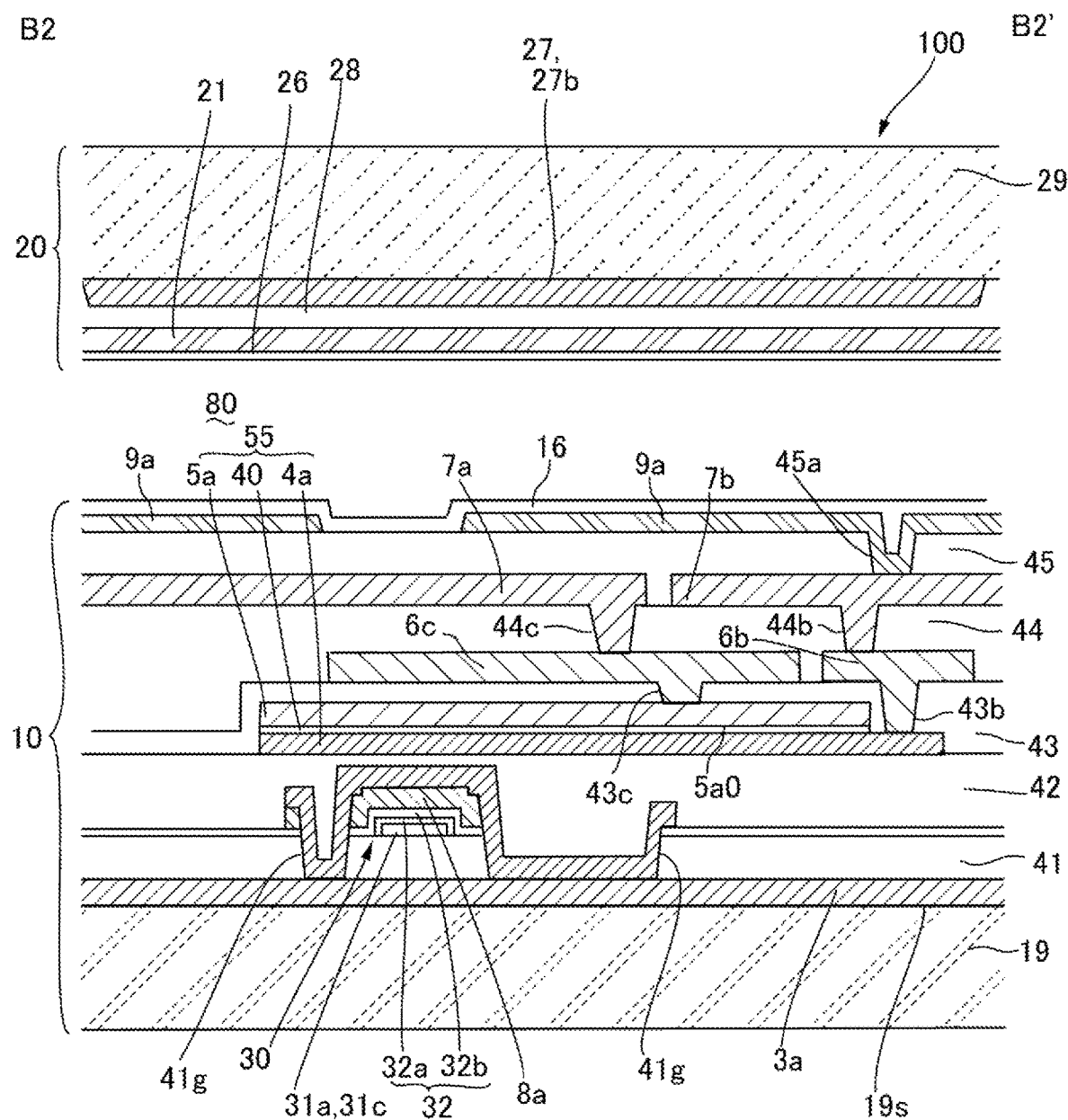
FIG. 14 is a B2-B2' cross-sectional view of FIG. 12.
Figure 15:
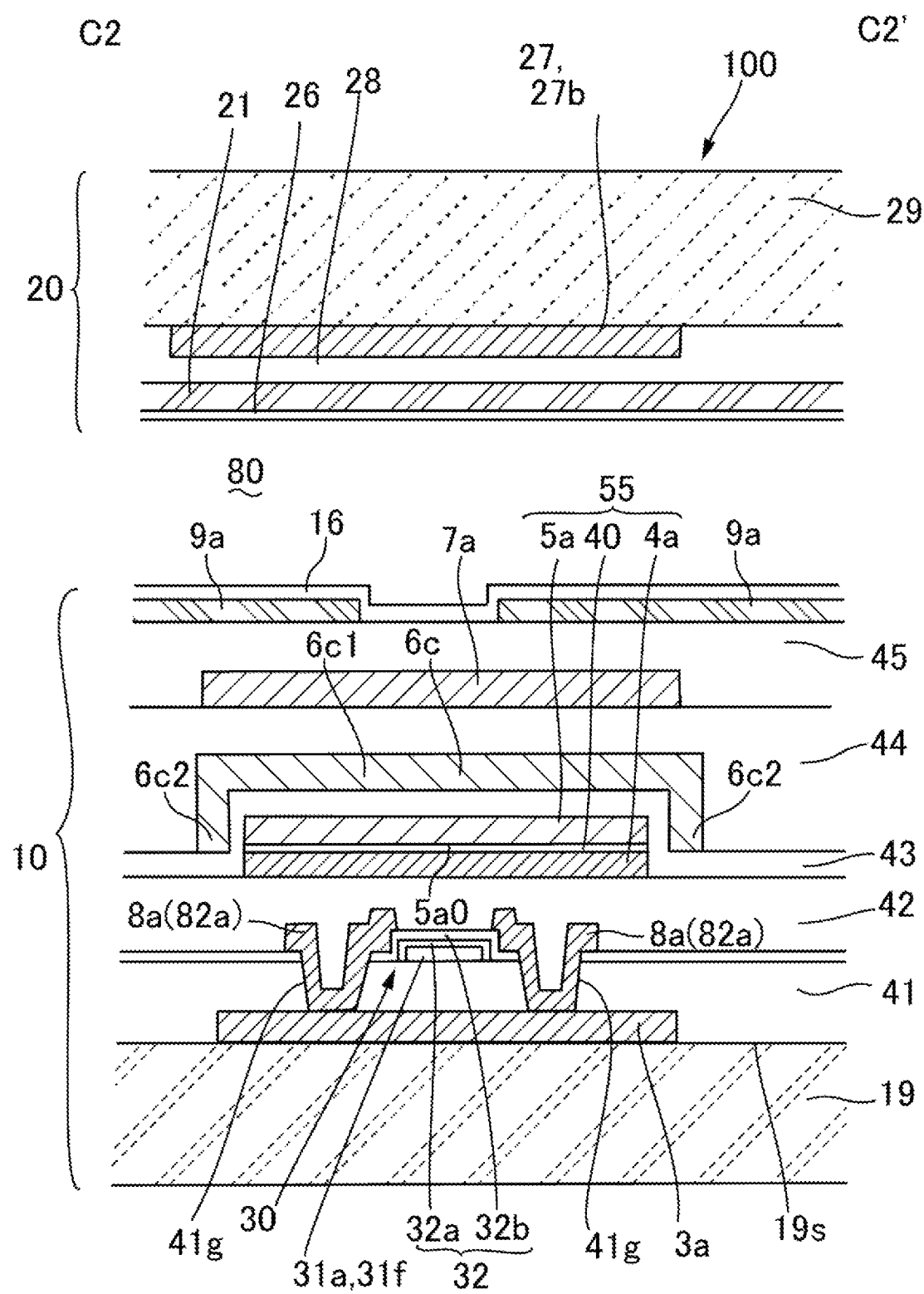
FIG. 15 is a C2-C2' cross-sectional view of FIG. 12.

FIG. 12 is an explanatory diagram of the electro-optical device 100 according to Exemplary Embodiment 2 of the present disclosure. FIG. 12 is an enlarged plan view illustrating a vicinity of the transistor 30. FIG. 13 is the A2-A2' cross-sectional view of FIG. 12. FIG. 14 is the B2-B2' cross-sectional view of FIG. 12. FIG. 15 is the C2-C2' cross-sectional view of FIG. 12. Note that basic configurations in this exemplary embodiment are the same as in Exemplary Embodiment 1, and thus, common portions are denoted by the same reference signs and a description of the common portions will be omitted.

As illustrated in FIG. 12 to FIG. 15, in the present exemplary embodiment as well, similar to Exemplary Embodiment 1, the capacitance element 55 including the first capacitance electrode 4a, the dielectric film 40, and the second capacitance electrode 5a is provided between the first interlayer insulating layer 42 and the second interlayer insulating layer 43 on an upper layer side of the transistor 30, and the first element portion 551 of the capacitance element 55 overlaps with the semiconductor layer 31a in plan view. The first capacitance electrode 4a and the second capacitance electrode 5a are each formed of a conductive polysilicon film.

The first substrate 10 is provided with a conductive light shielding layer including a first portion 6c1 overlapping in plan view with the second capacitance electrode 5a in a layer between the first element portion 551 of the second capacitance electrode 5a and the pixel electrode 9a. In the present exemplary embodiment, the light shielding layer is the light shielding relay electrode 6c configured by the same layer as the data line 6a, and the relay electrode 6c is electrically coupled to the capacitance line 7a. The second interlayer insulating layer 43 is formed between the second capacitance electrode 5a and the relay electrode 6c, the relay electrode 6c is electrically coupled to the second capacitance electrode 5a via the contact hole 43c that extends the second interlayer insulating layer 43.

As illustrated in FIG. 15, the relay electrode 6c includes a second portion 6c2 that protrudes from an end portion of the first portion 6c1 in the second direction Y toward the semiconductor layer 31a side through a side of the second capacitance electrode 5a. In the present exemplary embodiment, the second portion 6c2 protrudes through a side of the second capacitance electrode 5a toward both sides in a width direction of the semiconductor layer 31a. Here, an end portion of the second portion 6c2 protrudes from a surface 5a0 on the semiconductor layer 31a side of the second capacitance electrode 5a toward the semiconductor layer 31a side. Further, an insulating film covering a side surface of the first capacitance electrode 4a is provided at the first substrate 10, and the second portion 6c2 overlaps with the insulating film from a side opposite the first capacitance electrode 4a. In the present exemplary embodiment, the insulating film is the second interlayer insulating layer 43. The second interlayer insulating layer 43 extends from between the second capacitance electrode 5a and the relay electrode 6c with a substantially constant thickness so as to cover the side surface of the first capacitance electrode 4a, and the second portion 6c2 overlaps with the second interlayer insulating layer 43 from a side opposite the first capacitance electrode 4a.

In a manufacturing process of the electro-optical device 100 having such structure, the first capacitance electrode 4a, the dielectric film 40, and the second capacitance electrode 5a are formed at a surface of the first interlayer insulating layer 42 on the pixel electrode 9a side, and then collectively patterned to form the capacitance element 55. In addition, of the first capacitance electrode 4a, the dielectric film 40 and the second capacitance electrode 5a are removed by etching from a position where the contact hole 43b is to be formed.

Next, after the second interlayer insulating layer 43 is formed, the contact hole 43c and the like are formed in the second interlayer insulating layer 43. Next, after a light shielding conductive film is formed, the light shielding conductive film is patterned to form the relay electrode 6c. At this time, the data line 6a and the relay electrode 6b are formed simultaneously. In the present exemplary embodiment, a width in the second direction Y of the relay electrode 6c is greater than a width in the second direction Y of the first element portion 551, and is less than a width in the second direction Y of the scan line 3a.

In the electro-optical device 100 configured in this manner as well, in the first substrate 10, the relay electrode 6c as a light shielding layer is provided with the second portion 6c2 that protrudes from an end portion of the first portion 6c1 in the second direction Y toward both sides in a width direction of the semiconductor layer 31a through a side of the second capacitance electrode 5a, in a layer between the second capacitance electrode 5a and the pixel electrode 9a. Thus, of light incident on the first substrate 10 from the second substrate 20 side, light that attempts to proceed toward the semiconductor layer 31a through between the gate electrode 8a and the capacitance element 55 can be shielded by the second portion 6c2 of the relay electrode 6c. Therefore, incidence of light on the semiconductor layer 31a is suppressed.

Other Exemplary Embodiments

In the exemplary embodiments described above, the semiconductor layer 31a extends so as to overlap with the scan line 3a in plan view, but the present disclosure may be applied when the semiconductor layer 31a extends so as to overlap in plan view with the data line 6a.

In the exemplary embodiments described above, the data line 6a, the relay electrode 6c, and the capacitance line 7a constitute a light shielding member overlapping in plan view with the semiconductor layer 31a from the pixel electrode 9a side, but at least one of the first capacitance electrode 4a and the second capacitance electrode 5a may be a light shielding electrode, and a light shielding member overlapping in plan view with the semiconductor layer 31a from the pixel electrode 9a side may be constituted.

In the above-described exemplary embodiments, the electro-optical device 100 has been described as an example in which light source light is incident from the second substrate 20 side, but the present disclosure may also be applied to the electro-optical device 100 in which light source light is incident from the first substrate 10 side. Further, in the above-described exemplary embodiments, the case has been illustrated in which the electro-optical device 100 is the transmissive liquid crystal device, however, the present disclosure may be applied to a case in which the electro-optical device 100 is a reflection-type liquid crystal device. Further, the present disclosure may be applied to a case in which the electro-optical device 100 is an organic electroluminescence display device.

Installation Example to Electronic Apparatus

Figure 16:
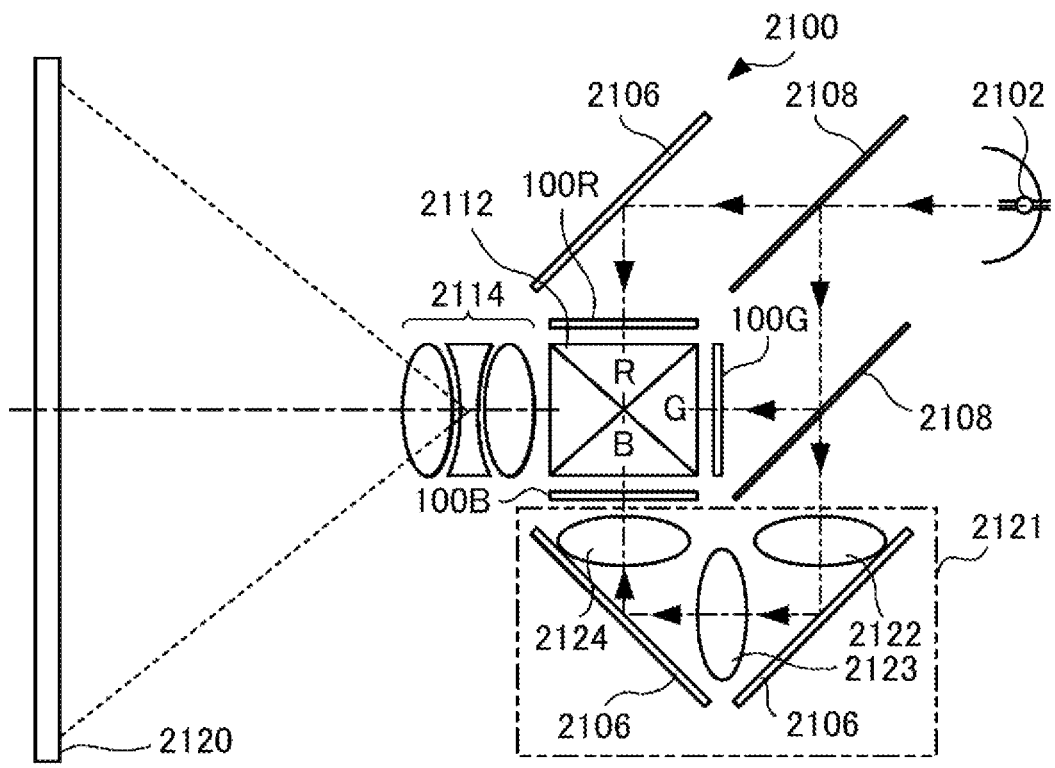
FIG. 16 is a schematic configuration view of a projection-type display device using an electro-optical device to which the present disclosure is applied.

An electronic apparatus using the electro-optical device 100 according to the above-described exemplary embodiments will be described below. FIG. 16 is a schematic configuration view of a projection-type display device using the electro-optical device 100 to which the present disclosure is applied. Illustration of an optical element such as a polarizing plate is omitted in FIG. 16. A projection-type display device 2100 illustrated in FIG. 16 is an example of an electronic apparatus using the electro-optical device 100. The projection-type display device 2100, in which the electro-optical device 100 is used as a light valve, can conduct high-definition and bright display without making the apparatus large. As illustrated in this figure, a light source unit 2102 including a lamp unit and the like including a white light source such as a halogen lamp is provided inside the projection-type display device 2100. Projection light emitted from the light source unit 2102 is split into three primary colors of R (red), G (green), and B (blue) by three mirrors 2106 and two dichroic mirrors 2108 installed inside. The split incident light is guided to light valves 100R, 100G, and 100B corresponding to each of the primary colors, and then modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, respective images of the primary colors are synthesized, and subsequently a color image is projected on a screen 2120 by a projection optical system 2114.

Other Projection-Type Display Devices

Note that the projection-type display device may include a configuration in which an LED light source or the like configured to emit light of each color is used as a light source unit and the light of each color emitted from the LED light source is supplied to another liquid-crystal device.

Other Electronic Apparatuses

The electronic apparatus including the electro-optical device 100 to which the present disclosure is applied is not limited to the projection-type display device 2100 of the above-described exemplary embodiment. Examples of the electronic apparatus may include a projection-type head up display, a direct-view-type head mounted display, a personal computer, a digital still camera, and a liquid crystal television.

What is claimed is:

1. An electro-optical device, comprising:
a substrate body;
a pixel electrode;
a transistor including a semiconductor layer in a layer between the substrate body and the pixel electrode;
a capacitance element including a first capacitance electrode overlapping with the semiconductor layer, the first capacitance electrode being in a layer between the transistor and the pixel electrode, and a second capacitance electrode overlapping with the first capacitance electrode, the second capacitance electrode being in a layer between the first capacitance electrode and the pixel electrode; and
a light shielding layer that includes a first portion overlapping with the second capacitance electrode between the second capacitance electrode and the pixel electrode, and a second portion protruding from an end portion of the first portion, through a side of the first capacitance electrode toward the substrate body side, the first portion being electrically coupled to the second capacitance electrode.

2. The electro-optical device according to claim 1, wherein
the second portion protrudes from an end portion of the first portion through a side of the first capacitance electrode toward both sides in a width direction of the semiconductor layer.

3. The electro-optical device according to claim 1, comprising:
an insulating layer covering a side surface of the first capacitance electrode, wherein
the second portion overlaps with the insulating layer from a side opposite the first capacitance electrode.

4. The electro-optical device according to claim 3, comprising:
a dielectric layer between the first capacitance electrode and the second capacitance electrode, wherein
the insulating layer is a side wall not overlapping in plan view with the second capacitance electrode, and covering a side surface of the first capacitance electrode and a side surface of the dielectric layer, and
the first portion is stacked on a surface of the second capacitance electrode on the pixel electrode side.

5. The electro-optical device according to claim 4, wherein
the second portion protrudes from a surface of the first capacitance electrode on the substrate body side toward the substrate body side.

6. The electro-optical device according to claim 5, comprising:
a first interlayer insulating layer provided in a layer between the transistor and the pixel electrode, wherein
a region exposed from the insulating layer and the capacitance element, of a surface of the first interlayer insulating layer on the pixel electrode side, is a recessed portion recessed from a region overlapping with the insulating layer and the capacitance element toward the substrate body side, and
the second portion protrudes from a surface of the first capacitance electrode on the substrate body side toward the substrate body side up to a position in contact with a bottom of the recessed portion.

7. The electro-optical device according to claim 6, wherein
a dimension of the second portion protruding from a surface of the first capacitance electrode on the substrate body side toward the substrate body side, is a dimension equal to a thickness of a portion of the second capacitance electrode protruding from the side wall toward the pixel electrode side, or a dimension greater than a portion of the second capacitance electrode protruding from the side wall toward the pixel electrode side.

8. The electro-optical device according to claim 3, wherein
the insulating layer is a second interlayer insulating layer extending from a portion between the second capacitance electrode and the light shielding layer so as to cover a side surface of the first capacitance electrode, and
the first portion is electrically coupled to the second capacitance electrode via a contact hole extending through the second interlayer insulating layer.

9. The electro-optical device according to claim 8, wherein
the light shielding layer is a relay electrode for applying a constant potential to the second capacitance electrode.

10. The electro-optical device according to claim 1, comprising:
a scan line extending in a first direction in a layer between the substrate body and the semiconductor layer; and
a data line extending in a second direction intersecting the first direction in a layer between the second capacitance electrode and the pixel electrode, wherein
the semiconductor layer extends in the first direction so as to overlap with the scan line, and
the capacitance element includes a first element portion including the second portion protruding toward both sides in the second direction of the semiconductor layer.

11. The electro-optical device according to claim 10, wherein
a width in the second direction of the light shielding layer is greater than a width of the first element portion in the second direction and is less than a width of the scan line in the second direction.

12. The electro-optical device according to claim 11, wherein
the capacitance element includes a second element portion extending in the second direction from a portion where the first element portion overlaps with the data line.

13. The electro-optical device according to claim 10, wherein
on a side of the semiconductor layer in the second direction, a contact hole is provided inside which a light shielding conductive layer electrically coupling a gate electrode of the transistor to the scan line is provided.

14. An electronic apparatus, comprising:
the electro-optical device according to claim 1.

* * * * *